(12) United States Patent
Prima et al.

(10) Patent No.: US 10,549,714 B2
(45) Date of Patent: Feb. 4, 2020

(54) GAS GENERATOR

(71) Applicant: AUTOLIV DEVELOPMENT AB, Vårgårda (SE)

(72) Inventors: Gerald Prima, Landrévarzec (FR); Sebastien Cornec, Quimper (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 38 days.

(21) Appl. No.: 16/063,015

(22) PCT Filed: Dec. 16, 2016

(86) PCT No.: PCT/EP2016/081468
§ 371 (c)(1),
(2) Date: Jun. 15, 2018

(87) PCT Pub. No.: WO2017/103135
PCT Pub. Date: Jun. 22, 2017

(65) Prior Publication Data
US 2019/0001917 A1     Jan. 3, 2019

(30) Foreign Application Priority Data
Dec. 18, 2015 (FR) ...................... 15 62881

(51) Int. Cl.
*B60R 21/264* (2006.01)
*B60R 21/26* (2011.01)

(52) U.S. Cl.
CPC .............. *B60R 21/2644* (2013.01); *B60R 2021/26076* (2013.01)

(58) Field of Classification Search
CPC .................................................. B60R 21/2644
See application file for complete search history.

(56) References Cited

U.S. PATENT DOCUMENTS

| 4,798,142 A | 1/1989 | Canterberry et al. |
| 5,100,174 A * | 3/1992 | Jasken ................ B60R 21/2644 |
| | | 102/530 |
| 5,590,905 A | 1/1997 | Cuevas |

(Continued)

FOREIGN PATENT DOCUMENTS

| FR | 2922007 A1 | 4/2009 |
| JP | 2011092853 A | 5/2011 |
| WO | WO-2009/043904 A2 | 4/2009 |

OTHER PUBLICATIONS

International Search Report for PCT/EP2016/081468, ISA/EP, Rijswijk, NL, dated Feb. 3, 2017 with English translation.

(Continued)

*Primary Examiner* — Faye M Fleming
(74) *Attorney, Agent, or Firm* — Stephen T. Olson; Harness, Dickey & Pierce, P.L.C.

(57) ABSTRACT

A gas generator includes at least one pyrotechnic substance, at least one subassembly formed at least of a first component and a second component, and at least one third component fixed to at least one of the first component and of the second component. The this component and one of the first component and of the second component each comprise an indexing interface arranged to temporarily block at least two degrees of freedom between the third component of the one of the first component and of the second component.

15 Claims, 1 Drawing Sheet

(56) References Cited

U.S. PATENT DOCUMENTS

| | | | | |
|---|---|---|---|---|
| 6,032,979 A * | 3/2000 | Mossi | ............... | B60R 21/2644 |
| | | | | 280/736 |
| 7,104,569 B2 * | 9/2006 | Goetz | ................. | B60R 21/261 |
| | | | | 280/736 |
| 7,374,204 B2 * | 5/2008 | Hoffman | ............ | B60R 21/2644 |
| | | | | 280/736 |
| 8,276,521 B2 * | 10/2012 | Reichelt | ............. | B60R 21/2644 |
| | | | | 102/530 |
| 2011/0083576 A1 | 4/2011 | Patton et al. | | |

OTHER PUBLICATIONS

Written Opinion of the ISA for PCT/EP2016/081468, ISA/EP, Rijswijk, NL, dated Feb. 3, 2017.

* cited by examiner

GAS GENERATOR

CROSS-REFERENCE TO RELATED APPLICATIONS

This application is a 371 U.S. National Stage of International Application No. PCT/EP2016/081468, filed Dec. 16, 2016. This application claims priority to French Patent Application No. 1562881, filed Dec. 18, 2015. The entire disclosures of the above applications are incorporated herein by reference.

The present invention relates generally to a gas generator designed for example to be mounted in a motor vehicle safety module such as an airbag.

It is known in the prior art to friction-weld gas generator components together in order to obtain a robust assembly. For example, document FR2922007 discloses a gas generator comprising three components that are friction-welded together. But this system has the particular drawback of being complicated to manufacture because two components must first be welded together in order then to be friction-welded onto the third. This intermediate operation extends the cycle time and increases the manufacturing cost.

One object of the present invention is to overcome the above-mentioned drawbacks and in particular, first of all, to propose a gas generator comprising three components welded together by one friction-welding operation, the assembly of which requires no complex operations.

To this end, a first aspect of the invention concerns a gas generator comprising:
- at least one pyrotechnic substance arranged to produce gases,
- at least one subassembly formed at least of a first component and a second component fixed together by friction welding,
- at least one third component fixed to at least one of the first component and of the second component by friction welding, characterized in that the third component and one of the first component and of the second component each comprise an indexing interface arranged so as temporarily to block at least two degrees of freedom between the third component of said one of the first component and of the second component on the other of the first component and of the second component. According to this implementation, the third component is indexed to one of the other two in order to be entrained by the latter during friction welding, which allows it to be friction-welded onto the other component at the same time. The indexing interface is provided in order to offer a removable or reversible indexing between their third component and said one of the first component and of the second component, prior to the friction welding operation. In other words, it is sufficient to index (by free interlocking or by force, snap-in fitting for example) the third component onto or into said one of the first component and of the second component, in order to obtain an intermediate subassembly during manufacture, just before friction-welding onto the other of the first component and of the second component. Consequently, it is understood that it is possible during the welding operation to provide a gripping tool only for the first and the second component because the third component is indexed by the first or the second component. Manufacture is therefore simplified, quicker and requires less investment.

Advantageously, the first component and the second component are fixed together along a friction-welded area, and the third component is fixed to at least one of the first component and of the second component by said friction welding of said first and second components, at said friction-welded area, (otherwise called inertia friction welding). According to this implementation, there is only one friction weld area for all three components. As a reminder, a friction weld is performed by pressing together the components to be assembled while one of the components is fixed and the other is rotating, so as to cause a rise in temperature caused by friction; a rise in temperature conducive to a mixing of the materials, then of a pasty consistency and resulting from the two components, that enables their assembly. A friction weld area is characterized at least by the presence of a bead or burr of material that has flowed back during the operation (if necessary, the bead may be removed by an additional operation). The weld area is usually sealed and very robust. According to the present implementation, since the first, second and third components are welded in the same area, the bead or burr of material is therefore common, which reduces the size of the assembly. In fact, it is not necessary to leave space for the formation of two separate beads. The material, when viewed under a microscope, shows that the three components share the same heat-affected area.

Advantageously, the first component and the second component have walls of predetermined thicknesses, and the third component has a wall of a thickness less than half the thickness of the first and/or of the second component. In other words, the third component is much thinner than the first and/or the second component, which allows it to be friction welded without affecting the fixing between the first and the second component and allows a thin component to be fixed by friction to a much thicker component, the first or the second component serving as a support for the third during the welding operation. In other words, the invention proposes friction-welding a third thin component at the same point as the weld between two other thicker components, which allows such a third thin piece to be friction-welded that would not be weldable by friction. A solid weld is obtained between the first and the second component, and at least one sealed weld between the third component and the first and/or the second component. Advantageously, the first and second components will have a thickness of between 1.2 mm and 3 mm and the third a thickness of between 0.5 mm and 1.5 mm.

Advantageously, friction welding is performed by a welding operation using a rotational inertia tool, and the indexing interface is arranged in order to guarantee a rotational entrainment of the third component by said one of the first component and of the second component, during the welding operation, with no contact between the rotational inertia tool and the third component.

Advantageously, the indexing interface is arranged to stop the translational movement of the third component by said one of the first component and or the second component, along an axis of rotation of the rotational inertia tool. In other words, the indexing provides a mechanical stop in the direction of the forging force.

Advantageously, the third component and said one of the first component and of the second component each have a side wall welded onto the other of the first component and of the second component, and the side wall of the third component is held at the side wall of said one of the first component and of the second component. It is therefore the same wall that is friction-welded and that ensures the holding and centering of the components. Centering and holding is therefore effective, since it is as close as possible to the welding area that generates all of the internal forces.

Advantageously, the indexing interface comprises specific deformed areas of a side wall of the third component and/or said one of the first component and of the second component. The indexing interface can comprise between 1 and 10 specific deformations and preferably comprises 6 deformations. Preferably, the deformations are diametrically opposed in pairs, in relation to a rotational axis of symmetry of the gas generator. In this configuration, the impact of the axial welding force on the indentation of the third component is limited.

Advantageously, the deformed areas are recesses facing towards the inside of the generator. These recesses are easy to manufacture, with a press and punches that push the material back.

Advantageously, the indexing interface forms an anchoring area for a fourth component crimped onto the subassembly. The recesses that serve as indexing on one face of the wall of said one of the first component and of the second component, can all of course serve as anchoring for crimping onto the other face of the wall of said one of the first component and of the second component. In fact, crimping requires a hollow portion (a groove, a well, a recess), and the invention proposes using the indexing interface provided for the third component. In other words, the indexing interface is reused on the other face of the first or second component to crimp a fourth component.

Advantageously, the fourth component comprises a collar arranged to serve as a fixing interface of the gas generator in a motor vehicle safety module. Fixing holes or studs can be provided on the collar.

Advantageously, the subassembly forms a chamber comprising pressurized gas.

Advantageously, the subassembly forms a combustion chamber of the gas generator and comprises at least one pipe arranged to control a pressurized combustion of said at least one pyrotechnic substance, and the third component is arranged between said at least one pipe and said at least one pyrotechnic substance. The third component is at the heart of the combustion chamber, between the pyrotechnic substance and the pipe or pipes.

The pyrotechnic substance can be in the form of pellets loaded randomly into the combustion chamber, but also in the form of a monolithic block.

Advantageously, the gas generator comprises at least one filter, arranged between the third component and said at least one pipe.

Advantageously, the third component is a setting screen. Such a screen, friction-welded, is then firmly attached to the generator structure, which makes it possible to resist the flow of gases generated during the operation of the gas generator (from a few liters to a few tens of liters of gas, i.e. between 0.1 and 10 moles of gas, pass through the grid in a time ranging between 5 ms and 100 ms).

Advantageously, the third component is an operculum. The seal provided by the friction weld guarantees that the pyrotechnic substance is stored away from water for a long period of time (up to 15 years for example).

Advantageously:
the first component comprises a bottom and a side wall arranged between the bottom and an opening arranged to receive said at least one pyrotechnic substance during the manufacture of the gas generator,
the third component is contained in the first component, and arranged between the opening and said at least one pyrotechnic substance.

Advantageously, the first component comprises a side wall and the third component comprises a side wall that marries up at least partially with the side wall of the first component.

Advantageously:
the second component has a wall,
the first component comprises a side wall perpendicular to the wall of the second component,
the third component comprises a side wall perpendicular to the wall of the second component,
and the friction weld is performed at the join of said wall of the second component, of said perpendicular side wall of the first component and of said perpendicular side wall of the third component.

Advantageously, a radial play between the side wall of the first component and the side wall of the third component is less than 0.5 mm.

Advantageously, the subassembly forms a casing, and the second component closes an opening of the first component.

A second aspect of the invention concerns a motor vehicle safety module comprising at least one gas generator according to the first aspect of the invention.

A second aspect of the invention concerns a motor vehicle comprising at least one gas generator according to the first aspect of the invention.

One aspect of the invention therefore concerns a gas generator comprising:
at least one pyrotechnic substance arranged to produce gases,
at least one subassembly formed at least by one first component and one second component fixed together by friction welding, along a friction-welded area,
at least one third component fixed to the subassembly, characterized in that the third component is fixed to at least one of the first component and of the second component by said friction welding of said first and second components, in said friction-welded area.

Advantageously, the third component and one of the first component and of the second component each comprise an indexing interface arranged to temporarily block at least two degrees of freedom between the third component and said one of the first component and of the second component, so as to enable simultaneous inertia friction welding of the third component and said one of the first component and of the second component onto the other of the first component and of the second component.

A final aspect of the invention concerns a method for the manufacture of a gas generator according to the first aspect, comprising the steps involving:
indexing the third component onto one of the first component and of the second component,
friction-welding said one of the first component and of the second component onto the other of the first component and of the second component.

Further features and advantages of the present invention will emerge more clearly from the following detailed description of an embodiment of the invention given by way of non-limiting example and shown in the accompanying drawings, in which.

Figure 1:
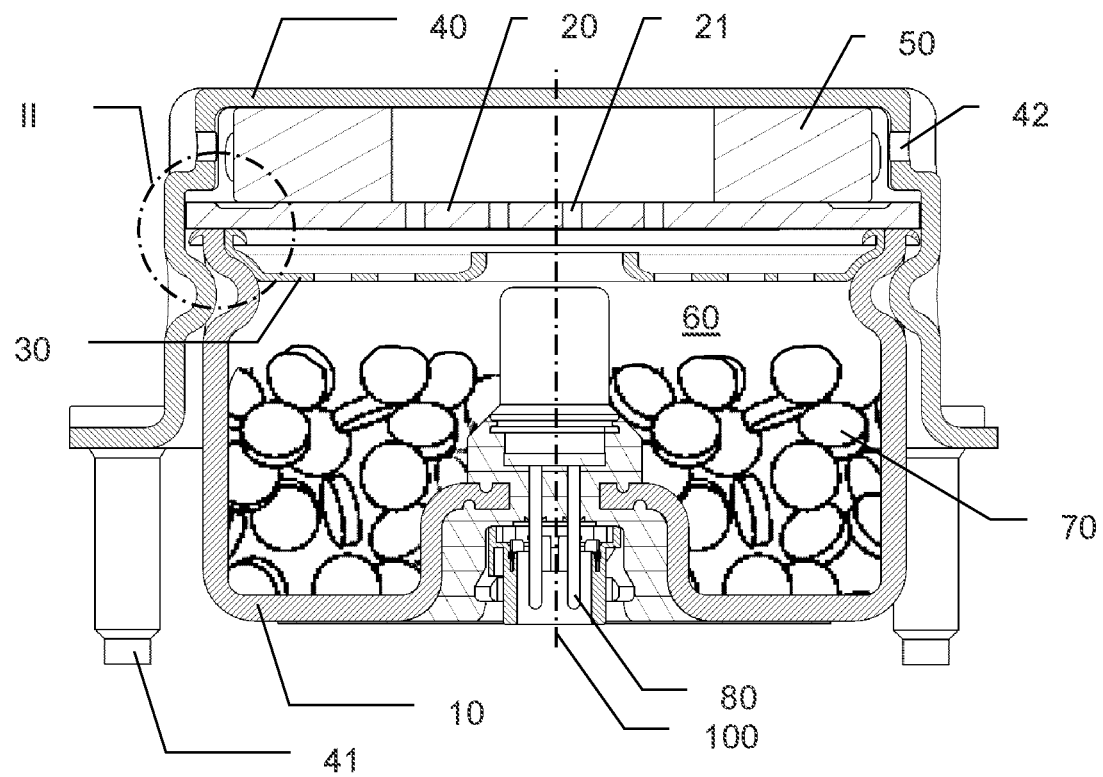
FIG. 1 represents a cross-section of a gas generator according to the present invention, comprising a combustion chamber formed by two friction-welded components.

FIG. 1 represents a gas generator comprising a combustion chamber 60 formed basically by a first component 10 friction-welded onto a second component 20, and which contains a pyrotechnic substance 70, an ignition subassembly 80 and a third component 30.

A fourth component 40 is fixed onto the first component 10 by crimping in order to position a filter 50 between the second component and diffusion holes 42 arranged in the fourth component 40. Moreover, the fourth component 40 comprises a collar on which are positioned studs 41, in order to fix the gas generator onto a safety module (an airbag), or directly onto a steering wheel of a vehicle for example.

The pyrotechnic substance 70 is in the form of pellets loaded randomly into the combustion chamber 60, but an ordered loading of pellets can also be envisaged, or even a pyrotechnic substance provided in the form of a monolithic block of propellant.

The ignition subassembly 80 is here overmolded onto the first component 10, so as to position its casing in the combustion chamber, and to have connector pins accessible from the outside of the gas generator. However, other assemblies are possible, such as, for example, crimping an electro-pyrotechnic igniter onto a metal component welded onto the first component 10.

The gas generator has a rotational shape, a disc shape, and as mentioned above, the first component 10 is friction-welded onto the second component 20. In fact, components with a rotationally symmetrical geometry lend themselves well to such friction welding, known otherwise as rotary inertia welding. During such a welding operation, the two components to be welded are held firmly in clamping jaws, and one (the first component 10, for example) is rotated at high speed and then pushed onto the second component 20 which remains stationary. Consequently, friction occurs between these two components, which causes a heating and therefore a softening of the substances, which allows the two components, under the action of an axial thrusting force, to be firmly fixed together.

The result of such a weld is visible in FIG. 1 in the form of beads or burrs of material on either side of the weld area. These beads 91 and 93, arranged on either side of the first component 10 are more clearly visible in FIG. 2. These beads 91 and 93 are created basically by the material of the first component 10 that is "driven in" during friction welding, under the effect of the axial force or forging force but also by the material of the third component 30. It should be noted that only two beads 91 and 93 are formed whereas two components are welded onto the second component 20. The value of this driving in, or axial displacement can be called "material consumption", and a minimum material consumption is required in order to achieve sufficient resistance and seal of the friction weld for a gas generator. For example, if the first component 10 has a thickness of 2 millimeters, the friction weld can then be considered to be capable of withstanding the pressure conditions in the generator if the material consumption is between 1.5 and 2.5 millimeters. For the weld to meet the specifications, the two components to be welded must become sufficiently hot and also similar component thicknesses should preferably be chosen otherwise only one of the two components would become hot. Thus, it is not feasible to weld two components of substantially different thicknesses. However, the invention proposes to weld, at the same time and at the same point as two thick components (the first component 10 and the second component 20) a third thinner component 30 that would not be easy to weld by inertia only because it is too deformable.

Clearly, other parameters must be monitored, such as the speed of rotation and the forging force. A helium seal test can also be performed to check that the weld meets the current sealing specifications for motor vehicle safety such as standard USCAR-24 2nd Revision of April 2013. For example, for a completely pyrotechnic generator, a combustion chamber with a helium escape rate of less than $1.10^{-4}$ $cm^3 \cdot atm^{-1} \cdot s^{-1}$ can be regarded as sealed (originally with 100% helium in the combustion chamber).

As explained above, a third component 30 is arranged in the combustion chamber 60, between the pyrotechnic substance 70 and the pipes 21 of the second component 20 that are arranged to control the combustion of the pyrotechnic substance 70, once ignited by the ignition subassembly 80 (typically, following a traffic accident, detected by an electronic control unit).

Figure 2:
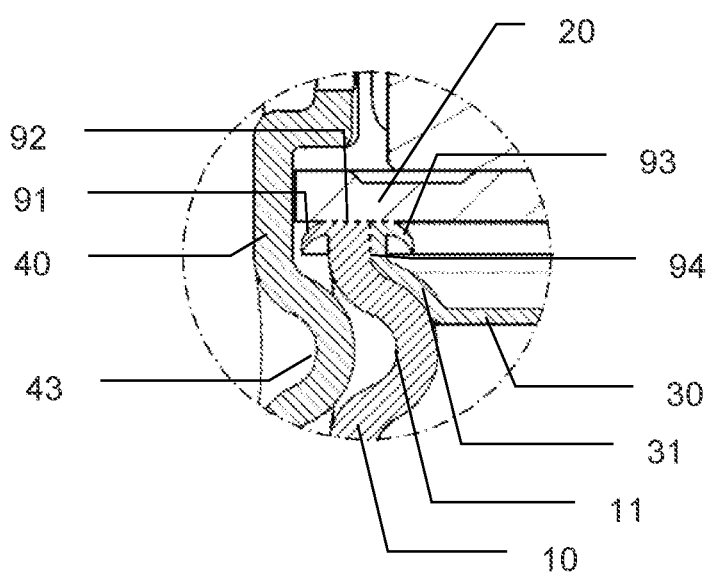
FIG. 2 represents a detail of the generator in FIG. 1, at a friction-welded area.

As shown in FIG. 1 and above all in FIG. 2, the third component is fixed to the first component 10 and the second component 20, at the same friction weld that connects these two components 10 and 20. In fact, the bead of material 93 is created both by the material of the first component 10 and by the material of the third component 30 and, above all, it is not formed between these two components 10 and 30. The core or wall of the first and third components 10 and 30 is located between the beads of material 91 and 93.

Moreover, it will also be observed in cross-section as in FIG. 2, that there is no more clearance or space between the first, second and third components 10, 20 and 30. In other words, we pass continuously from one of these three components 10, 20 and 30 to the others. The dotted lines 92 and 94 are represented in FIG. 2 to show this continuity of material between the components.

The third component 30 is therefore welded in the same friction-welded area as the first and second component 10 and 20. To this end, the invention envisages indexing the third component 30 in relation to the first component 10, in order to enable simultaneous friction welding between the three components 10, 20 and 30. In fact, the first component 10 comprises an indexing interface formed by recesses 11 on the side wall, which engage with an indexing interface of the third component 30 formed by recesses 31 in the side wall of the third component 30.

Consequently, the third component 30 can be pressed or inserted into the first component 10 before the welding operation, these two components 10 and 30 then form a subassembly that can be handled by gripping only the first component 10 (if the third component 30 is inserted by force for example), and friction-welded onto the second component 20. In fact, the indexing interfaces of the first component 10 and of the third component 30 prevent rotation between these two components about the axis 100 of the gas generator (the axis of rotation during friction welding), as well as stop translation along this same axis 100, in order to prevent the third component 30 from moving back in relation to the first component 10 under the effect of the forging force applied during the welding operation.

The invention thus enables simultaneous welding of the first component 10, the second component 20 and the third component 30 during the same welding operation, with no specific tooling required to hold the third component 30 (since it is the first component 10 that holds and indexes it).

Moreover, the invention proposes connecting the third component 30 in the same friction-welded area as the first and second components 10 and 20, which limits the number of beads of material.

Furthermore, the recesses 11 that face towards the axis 100 of the gas generator (towards its interior, i.e. towards the combustion chamber 60) form an ideal interface for a crimping operation. In fact, such a hollow geometry enables the material of an external component to be pushed back during a crimping operation (radial in the present case).

Consequently, the fourth component 40 is crimped onto the first component 10, with areas 43 of the fourth component pushed into the recesses 11 of the first component 10.

This crimping interface in common with the indexing interface of the first component 10 thus allows the design and manufacture of the components to be simplified, which also results in reduced costs.

It will be understood that various modifications and/or improvements obvious to a person skilled in the art can be made to the different embodiments of the invention described in the present description without departing from the scope of the invention defined by the accompanying claims.

The invention claimed is:

1. Gas generator comprising:
   at least one pyrotechnic substance arranged to produce gases,
   at least one subassembly formed at least of a first component and a second component fixed together by friction welding,
   at least one third component fixed to at least one of the first component and of the second component by friction welding,
   wherein the third component and one of the first component and of the second component each comprise an indexing interface arranged so as temporarily to block at least two degrees of freedom between the third component of the one of the first component and of the second component, so as to enable simultaneous inertia welding of the third component and the one of the first component and of the second component onto the other of the first component and of the second component.

2. The gas generator according to claim 1, wherein the first component and the second component are fixed together along a friction-welded area, and wherein the third component is fixed to at least one of the first component and of the second component by the friction welding of the first and second components, at the friction-welded area.

3. The gas generator according to claim 1, wherein the first component and the second component have walls of predetermined thicknesses, and wherein the third component has a wall of a thickness less than half the thickness of the first and/or of the second component.

4. The gas generator according to claim 1, wherein friction welding is performed by a welding operation using a rotational inertia tool, and wherein the indexing interface is arranged in order to guarantee a rotational entrainment of the third component by the one of the first component and of the second component, during the welding operation, with no contact between the rotational inertia tool and the third component.

5. The gas generator according to claim 1, wherein the indexing interface comprises specific deformed areas of a side wall of the third component and/or the one of the first component and of the second component.

6. The gas generator according to claim 1, wherein the deformed areas are recesses facing towards the inside of the generator.

7. The gas generator according to claim 1, wherein the indexing interface forms an anchoring area for a fourth component crimped onto the subassembly.

8. The gas generator according to claim 7, wherein the fourth component comprises a collar arranged to serve as a fixing interface of the gas generator in a motor vehicle safety module.

9. The gas generator according to claim 1, wherein the subassembly forms a combustion chamber of the gas generator and comprises at least one pipe arranged to control a pressurized combustion of the at least one pyrotechnic substance, and the third component is arranged between the at least one pipe and the at least one pyrotechnic substance.

10. The gas generator according to claim 9, further comprising at least one filter, arranged between the third component and the at least one pipe.

11. The gas generator according to claim 1, wherein the third component is a setting screen.

12. The gas generator according to claim 1, wherein the third component is an operculum.

13. The gas generator according to claim 1, wherein:
   the first component comprises a bottom and a side wall arranged between the bottom and an opening arranged to receive the at least one pyrotechnic substance during the manufacture of the gas generator; and
   the third component is contained in the first component, and arranged between the opening and the at least one pyrotechnic substance.

14. The gas generator of claim 1 in combination with a motor vehicle safety module.

15. The gas generator of claim 1 in combination with a motor vehicle.

* * * * *